(12) United States Patent
Wrotek et al.

(10) Patent No.: US 10,445,931 B1
(45) Date of Patent: Oct. 15, 2019

(54) DIRECTIONAL DILATION AT A MESH BOUNDARY OF THREE-DIMENSIONAL IMAGES

(71) Applicant: Electronic Arts, Inc., Redwood City, CA (US)

(72) Inventors: Pawel Piotr Wrotek, San Mateo, CA (US); Darren Douglas Gyles, San Francisco, CA (US)

(73) Assignee: Electronic Arts, Inc., Redwood City, CA (US)

( * ) Notice: Subject to any disclaimer, the term of this patent is extended or adjusted under 35 U.S.C. 154(b) by 8 days.

(21) Appl. No.: 15/937,299

(22) Filed: Mar. 27, 2018

(51) Int. Cl.
G06T 9/00 (2006.01)
G06T 15/04 (2011.01)
G06T 17/20 (2006.01)

(52) U.S. Cl.
CPC ............ G06T 17/205 (2013.01); G06T 9/001 (2013.01); G06T 15/04 (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 6,192,155 | B1 * | 2/2001 | Fan | G06T 9/00 382/232 |
| 8,681,147 | B1 * | 3/2014 | Baraff | G06T 19/20 345/419 |
| 8,704,823 | B1 * | 4/2014 | Waggoner | G06T 13/00 345/419 |
| 9,626,809 | B1 | 4/2017 | Nair et al. | |
| 9,892,540 | B2 | 2/2018 | Nair et al. | |
| 2007/0024632 | A1 | 2/2007 | Couture-Gagnon | |
| 2008/0303840 | A1 * | 12/2008 | Zhou | G06T 15/04 345/585 |
| 2013/0016112 | A1 * | 1/2013 | Burley | G06T 15/04 345/582 |
| 2014/0052427 | A1 * | 2/2014 | Yahiaoui | G06T 17/05 703/10 |
| 2014/0253551 | A1 * | 9/2014 | Schmidt | G06T 15/00 345/427 |
| 2016/0027200 | A1 | 1/2016 | Corazza et al. | |
| 2016/0030839 | A1 | 2/2016 | Nair et al. | |

(Continued)

OTHER PUBLICATIONS

Office action for U.S. Appl. No. 15/927,689, dated May 30, 2019, Wrotek, "Skinning Weights and Underlying Object Suppression of Three-Dimensional Images ", 21 pages.

(Continued)

*Primary Examiner* — Edward Martello
(74) *Attorney, Agent, or Firm* — Lee & Hayes, P.C.

(57) ABSTRACT

A system and method directionally dilate texture onto mesh seams of a laid-out mesh of a three-dimensional image to reduce image artifacts arising from traditional omni-directional dilating. The dilation direction may be determined for a border pixel of a laid-out mesh based at least in part on one or more vertices of the laid-out mesh. Dilation directions determined for mesh border pixels may be encoded onto one or more data channels associated with the corresponding border pixels. The dilation directions at each of the border pixels may be used to incrementally dilate texture onto a predetermined number of pixels of border seams until the entirety of the border seam pixels are dilated.

20 Claims, 11 Drawing Sheets

(56) References Cited

U.S. PATENT DOCUMENTS

| | | |
|---|---|---|
| 2016/0035142 A1 | 2/2016 | Nair et al. |
| 2016/0117865 A1 | 4/2016 | Nair et al. |
| 2017/0032560 A1 | 2/2017 | Dionne et al. |
| 2018/0122140 A1 | 5/2018 | Janzer et al. |
| 2019/0035149 A1 | 1/2019 | Chen et al. |

OTHER PUBLICATIONS

Oh, et. al., "Generating Unified Model for Dressed Virtual Humans," Jun. 2005, Pacific Graphics, Jun. 2005, 9 pages.

\* cited by examiner

Determine Dilation Direction for Vertex

Encode Dilation Direction Using Data Channels

Vertex Red Channel (Horizontal Component):
$\sin(\Theta) = 0.866$ encoded as $(221)_{10} = (11011101)_2$
Vertex Green Channel (Vertical Component):
$\cos(\Theta) = 0.5$ encoded as $(127)_{10} = (01111111)_2$ Commence Directional Dilation Continue Directional Dilation

DIRECTIONAL DILATION AT A MESH BOUNDARY OF THREE-DIMENSIONAL IMAGES

BACKGROUND

Three-dimensional images may be rendered for various purposes, such as video games, online gaming, scientific purposes, object modeling, documentation, or the like. These images, in some applications, such as gaming, may be modified or customized after initially being formed. For example, a user may color and/or texture a three-dimensionally rendered image by customizing after the image has been formed. An image manipulation system may color and/or texture the three-dimensional images, according to user input, by forming a mesh of the image, where the mesh may have a plurality of polygons defined by vertices of the polygons. Each of these polygons may be assigned a color and/or texture to define the overall texture of the three-dimensional image.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
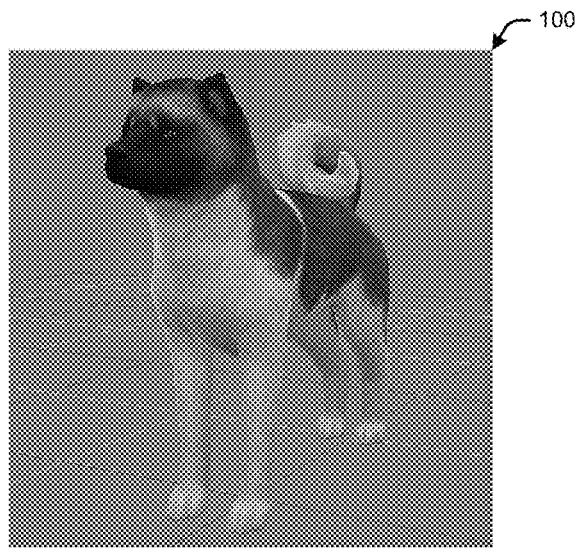
FIG. 1 illustrates a schematic diagram of an example three-dimensional image of a character and its corresponding mesh, in accordance with example embodiments of the disclosure.
Figure 1:
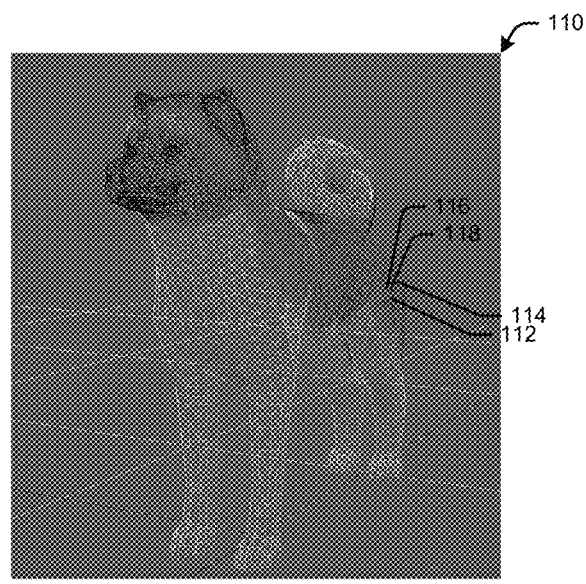

Users can change images and graphics, but when they do so, the textures applied across mesh border seams do not render properly. This is due to traditional techniques which apply textures in an omnidirectional, or directionless, manner to the mesh border seams. As the textures are not applied considering the direction of related polygons, undesirable artifacts such as black space, uneven positioning of features, and/or improper colors arise. Accordingly, the disclosed embodiments describe methods and systems that apply direction dilation at mesh border seams. With the direction dilation systems and methods disclosed, the undesirable artifacts created by traditional systems can be reduced or eliminated.

Example disclosed embodiments describe methods, apparatuses, computer-readable media, and systems for directional dilation at mesh (e.g., wire mesh) and/or UV borders of three-dimensional characters. Directional dilation may reduce image artifacts that may result from omnidirectional dilation at a laid-out mesh border. Example embodiments of this disclosure further describe methods, apparatuses, computer-readable media, and systems for painting mesh polygons of three-dimensional characters in a direction normal to a face of the polygons. Paint tools that enable painting in a direction normal to each polygon, and automatically adjust to a normal direction when painting across the borders of polygons in the mesh, may provide improved control to a user who wishes to paint and/or texturize a three-dimensional image of an object.

According to example embodiments, three dimensional objects, such as video game characters, may be rendered as images on a display screen, such as a video display of a computer. These images may be generated by creating a mesh of the object image, where the mesh includes a plurality of vertices defining the outer surface of the object that is to be rendered as an image. The vertices, as provided in a two-dimensional projection of three-dimensional space, may define the shape of the imaged object. The vertices of the mesh also define polygons (e.g., triangles, quadrilaterals, pentagons, etc.) therebetween. The number of vertices, and therefore, the number of polygons in the mesh, may be selected to provide a sufficient resolution of topography of the object being imaged, as a trade-off to the amount of processing bandwidth used to image and/or animate the image of the object.

According to example embodiments, the mesh may be laid-out flat for the purposes of assigning texture (e.g., color, patterns, etc.) to the polygons of the mesh. In this process, U and V coordinates (UV coordinates) may be used to define locations of texture on the mesh, such as seams (UV seams), since X and Y coordinates are used to define the vertices of the mesh. In this way, texture may be assigned to the constituent polygons of the laid-out mesh, such as by an artist or a user who wishes to change the texture after the image of the object is formed. When texture is defined for the polygons of the mesh, a process of dilation may be performed, where the mesh boundary and/or UV seam may be textured based at least in part on the texture of adjacent polygons. In this disclosure, it will be understood that the directional dilation of laid-out mesh border seams may also refer to UV seams that correspond to the mesh border seams.

In certain mesh boundaries, such as border seams of a laid-out mesh, an omnidirectional dilation process of pushing texture onto the border seam may result in image artifacts of the object image. The artifacts may include a misalignment of texture that should be seamless on the image of the object. As a result, according to disclosed example embodiments, a directional dilation process may be used to provide texture to the laid-out mesh border seams and/or UV border seams.

According to example embodiments, the direction in which the dilation process is to occur on a laid-out border seam may be determined at a border vertex on the border seam. The direction of dilation at the border vertex may be determined based at least in part on a nearest adjacent inner vertex or vertices. The border vertex may be a vertex of the object mesh that is on a border or edge when the object mesh is laid open. An inner vertex may be a vertex of the laid-out mesh that is not on the border or edge of the laid-out mesh. These vertices may be referenced by their corresponding UV coordinates.

The direction of dilation at a border vertex on a border seam may be determined as a unit vector in the direction from the nearest inner vertex to the border vertex for which the dilation direction is being determined. In the case where there may be more than one inner vertices for a given border vertices, the dilation direction may be determined as a combination of unit vectors from each of the inner vertices to the border vertex. In further example embodiments, a dilation direction at a corner border vertex may be determined using its two nearest border vertices. The dilation direction may be a combination of unit direction vectors from each of the border vertices to the corner vertex.

The dilation direction at a border pixel of the laid-out mesh may be determined based at least in part on the dilation direction determined for that pixel's nearest border vertices. In some cases, the most proximal border vertices of a border pixel may be a corner vertex of the laid-out mesh. The dilation direction, in some example embodiments, may be an interpolation of the dilation direction determined for its two nearest border vertices. In alternate embodiments, the dilation direction of a pixel may be set to its most proximal border vertex.

In example embodiments, after a dilation direction is determined for a border pixel, for the purposes of dilating the laid-out mesh border seam, the dilation direction may be encoded in one or more data channel(s) and/or as metadata associated with the border pixel and/or vertex. For example, the dilation direction at a border pixel may be used to determine a vertical and horizontal component, and then the vertical component may be encoded onto a first data channel of the pixel and the horizontal direction may be encoded onto a second data channel of the pixel. In some cases, these data channels may be any suitable location where descriptive data about the border pixels and/or vertices may be stored. For example, border pixels and vertices may have red, blue, and green (RGB) color channels associated therewith. In some cases, the dilation direction may be encoded onto one or more of the R, G, and/or B channels. There may be other suitable data channels and/or metadata where the dilation direction may be stored.

When the image of the object is to be dilated, according to example embodiments, the dilation direction may be determined at each of the border pixels of the laid-out mesh of the object image, and used to dilate by a predetermined number of pixels in the dilation direction. Thus, the texture that is proximate to the border seam may be pushed out in the dilation direction determined for the border pixel on the border seam. In example embodiments, the dilation direction may be determined for each border pixel during dilation, by accessing the data channel(s) for the border pixel on which the dilation direction may have been previously encoded and stored.

The directional dilation, as disclosed herein, may prevent artifacts that may otherwise arise in texturing across mesh border seams of a laid-out image of an object. This directionality of dilation may, in effect, cause the dilating of mesh seams that would connect when the mesh is not laid-out to be dilated in a manner where the two seams are dilated in a direction consistent with each other. In other words, the directional dilation may address the discontinuity that may arise in border seams relative to internal seams, when a mesh is laid-out. As a result, a more consistent dilation process is implemented in accordance with the disclosure herein. The directional dilation, as described herein, may result in a better alignment of texture features across mesh border seams when rendering the three-dimensional object, compared to omni-directional and/or random-directional dilation on the laid-out border seams.

According to additional embodiments of the disclosure, a painting and/or texturing tool may be provided, where the tool applies paint and or texture in a direction substantially normal to a surface of an object on which texture is being applied, regardless of the perspective from which the object image is viewed. In other words, as the paint tool is used on the object, the direction from which texture (e.g., paint) is applied may change, such as in an automatic fashion, from the perspective of the user of the paint tool. Additionally, the direction from which texturing is applied to the object may be different from the viewing direction of the object.

In some example embodiments, an image and/or icon associated with the paint tool, when in use, may be displayed along with the image of the object. This image of the paint tool may be displayed in relative proximity of the locations on the image of the object that are being painted. Additionally, in example embodiments, the image of the paint tool may move or rotate to indicate a change in a direction from which texture is applied.

When the paint tool is invoked, such as by user input, the location of the paint tool may be determined and used to generate a view of the object being painted from the perspective of the paint tool. This view may be generated by a rendering by a graphics processing unit (GPU) and/or central processing unit (CPU) of an image manipulation system. Once a view is generated from the perspective of the paint tool, the view may be populated with a UV coordinates that map individual pixels on the rendered view to coordinates on the corresponding laid-out mesh. As texture is applied to the object, the corresponding UV coordinates may be determined from the mapping of coordinates on the view from the paint tool's perspective. The texture for the pixels may be defined using the UV coordinates, as determined from the mapping. After the pixel textures are defined on the laid-out mesh, a dilation may be performed. If the textured region extends to the borders of the laid-out mesh of the object, then a directional dilation, as described herein, may be performed.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example three-dimensional image 100 of a character and its corresponding mesh 110, in accordance with example embodiments of the disclosure. One or more image manipulation system(s) may generate the image 100 and/or mesh 110 based at least in part on input to the one or more image manipulation system(s) by a user. The user may, for example be an artist who creates the image and/or another user of the image who modifies the image. In either case, the one or more image manipulation system(s) receive information about the object (e.g., a dog) in the image and generates and/or modifies the image appropriately, in accordance with example embodiments of the disclosure.

The image 100 shows a three-dimensional (3D) rendering of a dog. As can be seen, the 3D rendering may be a two-dimensional (2D) projection of a 3D object. Although a dog is used as an example object and image throughout this description, it will be appreciated that the systems, methods, and computer-readable media, as disclosed herein, may apply to any suitable object. The image 100 is shown in a particular direction, such as from a front-side view, of the dog. It will be appreciated that the dog in the image 100 can be rotated in any suitable direction in accordance with example embodiments of the disclosure. The image 100 may be generated by one or more image manipulation system(s) where a user may create the image 100 by defining various characteristics of the dog, such as the texture at various places on the dog surface. For example, an artist may define the color of the fur on the dog.

In creating the image 100 of the dog, image manipulation system(s) may generate a mesh 110 of the dog. The mesh 110, or wire mesh, is generated by defining vertices over a surface of the object of image 100 to define the object, such as the dog. For example, mesh 110 may include vertices 112, 114, 116. These vertices 112, 114, 116 may define a polygon 118 therebetween. Although the polygon in this case is a triangle having three vertices 112 114, 116, it should be understood that any suitable polygon, such as a rectangle or a pentagon, may define a portion of the surface of the object of image 100.

When texture is defined on the object being imaged, such as the dog of image 100, a user generating the image 100 may define and/or assign texture for each of the polygons, such as polygon 118, of the object. In this way, as all of the polygons are defined with texture, the image 100 may be partially formed from the mesh 110. However, in such a definition of texture within the polygons of the mesh 110, borders where the mesh 110 may be laid open may not be defined with texture.

To prevent image artifacts along laid-out mesh seams, according to example embodiments, texture from within a polygon of the mesh may be provided onto at least a portion of adjacent UV seams of a laid-out mesh in a directional manner. This process of dilation of the border seams may generate a more natural looking image 100 of an object. When the dilation is performed, the mesh of the object may be laid-out, or in other words, opened and flattened. This may cause artifacts to arise during the dilation process on the seams that are on the edge of the laid-out mesh. The disclosure herein includes methods, systems, and computer-readable media that mitigate and/or prevent artifacts on the edges of a laid-out mesh by performing directional dilation.

Figure 2:
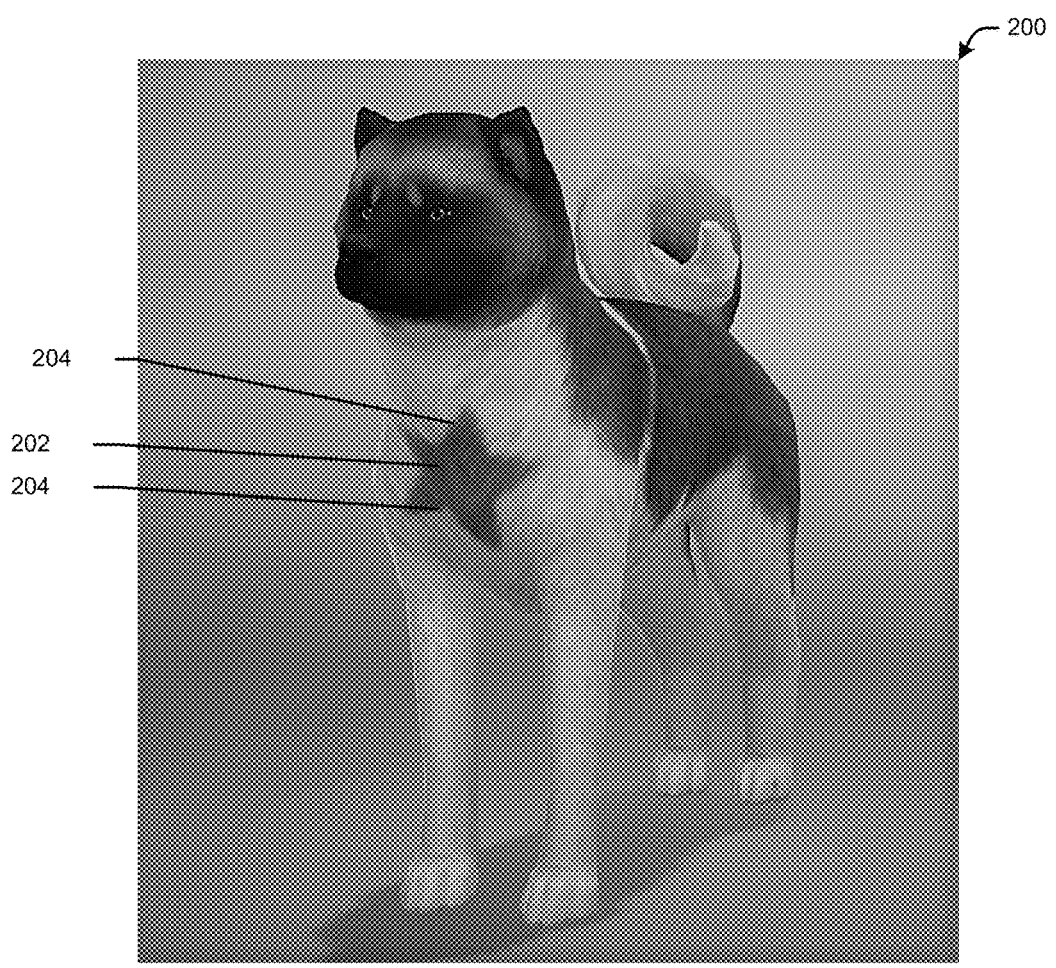
FIG. 2 illustrates a schematic diagram of an example customized image as a variation of the three-dimensional image of the character of FIG. 1, in accordance with example embodiments of the disclosure.

FIG. 2 illustrates a schematic diagram of an example customized image 200 as a variation of the three-dimensional image 100 of the character of FIG. 1, in accordance with example embodiments of the disclosure. One or more image manipulation system(s) may generate the customized image 200 based at least in part on input to the image manipulation system by a user, such as a remote user (e.g., an online game player who wishes to modify his/her character). Thus, the one or more image manipulation system(s) receive information about the object (e.g., the dog) in the image and generates and/or modifies the image appropriately, in accordance with example embodiments of the disclosure.

Objects may be customized after forming such as in the customized image 200 which shows the dog of image 100 with a pattern 202 thereon. The pattern 202 may include edges 204 for example that may cross over mesh polygon boundaries. Furthermore, if these features, such as pattern 202, cross over a boundary of a laid-out mesh, then there may be image artifacts in rendering the pattern 202, particularly if the pattern 202 overlaps borders of a corresponding laid-out mesh. These artifacts may be a result of dilation from a single polygon rather than two polygons at border seams of the laid-out mesh. According to example embodiments of the disclosure, the artifacts as discussed here, may be minimized or eliminated by dilation in a directional fashion for border seams of a laid-out mesh.

In example embodiments, the customized image 200 may be formed by a user other than the user who formed the image 100. For example, the images 100, 200 may be generated as part of a video game, such as an online game. The online game may be any suitable game, such as, for example, life simulation games, such as SIMS 4™ by Electronic Arts Inc. of Redwood City, Calif. In such a simulation game, an online player may customize an object of images on a client device (e.g., home computer, game machine, Sony Play Station™, etc.) which is communicatively coupled to an image manipulation system. The image manipulation system may perform the directional dilation, as discussed herein, based at least in part on actions by a user on a client device. Although the disclosure herein may be discussed in the context of video games and/or online gaming, it should be appreciated that the disclosure, according to example embodiments, apply to imaging for other purposes, such as scientific imaging, modeling, and/or various other forms of 3D virtualizations.

Figure 3:
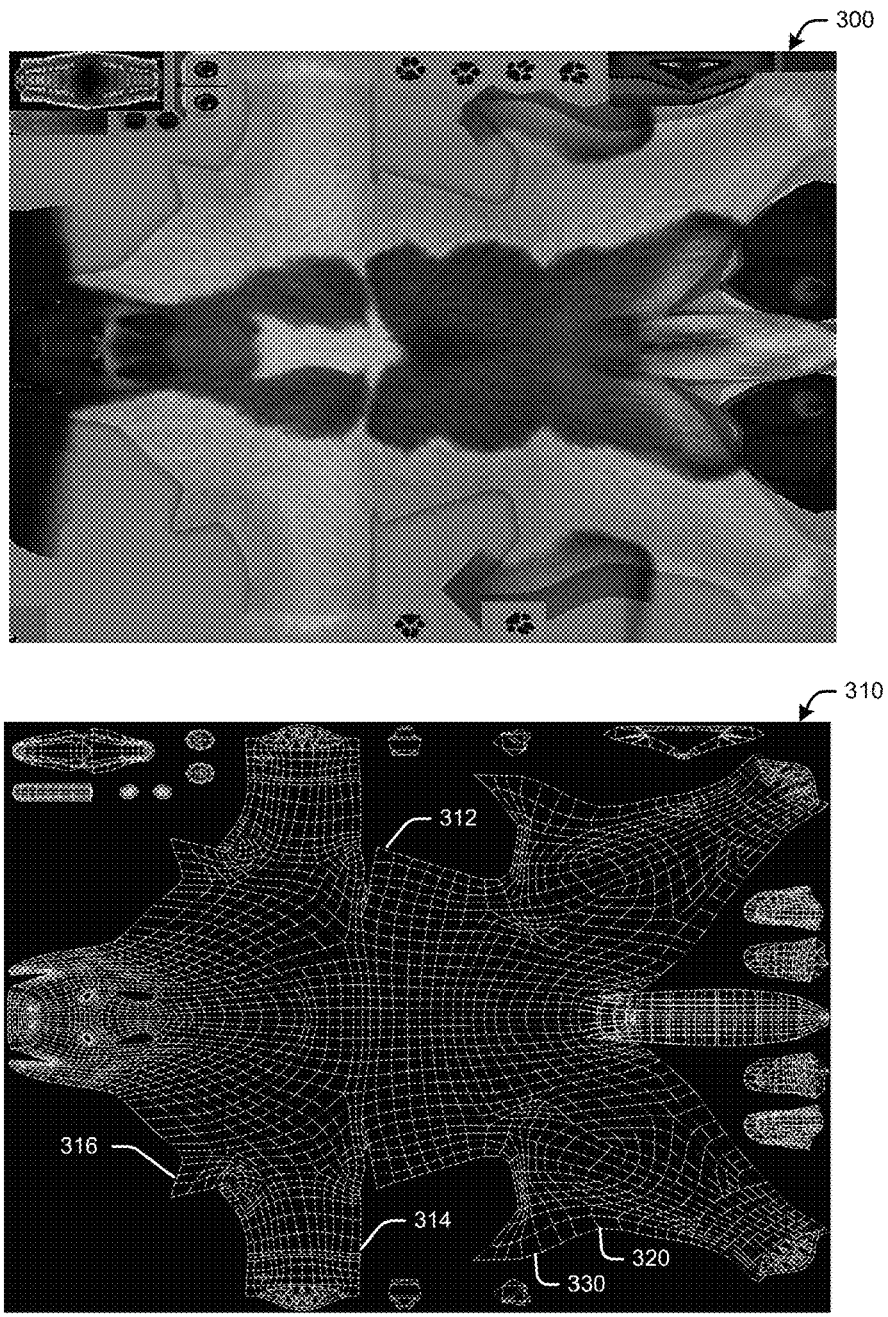
FIG. 3 illustrates a schematic diagram of an example laid-out image of the character of FIG. 1, as well as an example laid-out mesh of the laid-out image of the character of FIG. 1, in accordance with example embodiments of the disclosure.

FIG. 3 illustrates a schematic diagram of an example laid-out image 300 of the character of FIG. 1, as well as an example laid-out mesh 310 of the laid-out image of the character of FIG. 1, in accordance with example embodiments of the disclosure.

Laid-out image 300 shows the object of FIG. 1 in a laid-out fashion, where the object is opened up along a border and flattened. In this case, the object, such as the dog, may be opened along a seam and spread open for the user to texture according to polygons 118 of the mesh 110 of the object. Similarly, the mesh 110 of the object may be laid-out in a similar fashion as the laid-out image 300 of the object as the laid-out mesh 310. In both the laid-out image 300 and the laid-out mesh 310 of the object, various parts of the object may be separately laid-out as shown, such as the dog's eyes, paws, and the like. In the laid-out mesh 310 there may be border regions 312, 314, 316 of the laid-out mesh 310. These border regions 312, 314, 316 may include border vertices, such as border vertex 320, as well as border seams, such as border seam 330. According to example embodiment of the disclosure, when texture is dilated on to the border seam 330, the dilation process may be performed directionally to mitigate artifacts that may arise if the object corresponding to the laid-out mesh 310.

Figure 4:
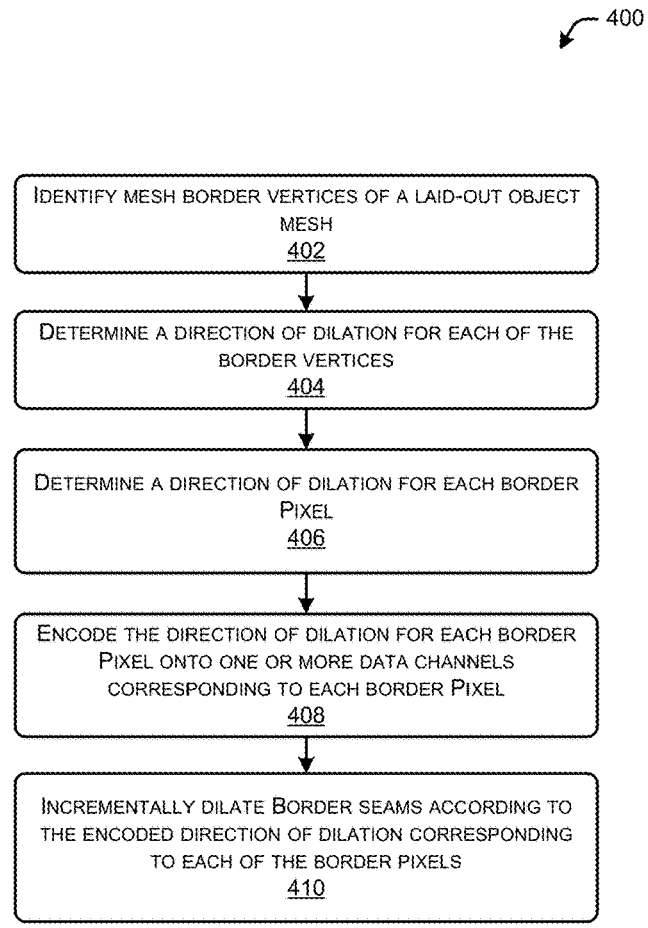
FIG. 4 illustrates a flow diagram of an example method to dilate border mesh seams, in accordance with example embodiments of the disclosure.

FIG. 4 illustrates a flow diagram of an example method 400 to dilate border mesh seams, in accordance with example embodiments of the disclosure. Method 400 may be performed by one or more image manipulation system(s) in example embodiments. In some cases, the image manipulation system(s) may cooperate with one or more other computing system(s) to perform the processes of method 400. The method 400, in example embodiments, may be performed in response to user input(s) to perform the processes of method 400. These user inputs may be to the image manipulation system(s) directly, or via one or more client devices.

At block 402, mesh border vertices of a laid-out object mesh may be identified. This identification process may be performed by finding the border of the laid-out mesh and identifying each of the vertices along that border. In some example embodiments, the border vertices may be distinguished from internal vertices, by determining if a polygon is defined by the vertex in all directions. If a vertex does not have a polygon defined in all directions (e.g., polygons 360° around the vertex), then that vertex may be a border vertex.

At block 404, a direction of dilation for each of the border vertices may be determined. This determination may be based at least in part on one or more other vertices of the laid-out object mesh. For some border vertices, the direction of dilation may be determined based upon one or more internal vertices of the laid-out object mesh. For some other border vertices, such as corner vertices, the direction of dilation at the corner of the laid-out object mesh may be determined based at least in part on two border vertices that are neighbors of the corner vertex. Corner vertices are border vertices that may not have a nearest neighbor interior vertex.

The border vertex dilation direction of a particular border vertex may be determined based at least in part on its nearest neighbor internal vertices. A unit direction vector may be determined from nearest neighbor internal vertex to the border vertex. Such a unit directional vector may be determined for each of the nearest neighbor internal vertices of the border vertex for which the dilation direction is to be determined. In some cases, there may only be a single internal vertex for a border vertex. In other cases, there may be more than one nearest neighbor internal vertices for the border vertex for which dilation direction is to be determined. Once the directional unit vectors are determined for the border vertex, the directional unit vectors may be combined to determine the direction of dilation. The combination of the directional unit vectors may generate a dilation direction vector representing the dilation direction at the border vertex. For a corner border vertex, a similar procedure may be performed to determine the dilation direction. For example, directional unit vectors may be determined from each of the two adjacent border vertices to the corner vertex. Next, the two unit directional vectors may be combined to determine the dilation direction at the corner vertex.

At block 406, a direction of dilation may be determined for each border pixel. The dilation direction at a border pixel of the laid-out mesh may be determined based at least in part on the dilation direction determined for that pixel's nearest border vertices, as determined by the operations of block 404. In some cases, the most proximal border vertices of a border pixel may be a corner vertex of the laid-out mesh.

The dilation direction, in some example embodiments, may be an interpolation of the dilation direction determined for its two nearest border vertices. In alternate embodiments, the dilation direction of a pixel may be set to its most proximal border vertex.

At block 408, the direction of dilation for each border pixel may be encoded on to one or more data channels corresponding to each border pixel. Each of the pixels of the laid-out mesh 310 may have a number of data channels on which information may be encoded. For example, each pixel may have data channels corresponding to red, green, or blue colors. These data channels, may be used to store information about the direction of dilation at each of the border pixels. For example, the direction of dilation may be expressed as a vertical component and a horizontal component. Next, the horizontal component of the dilation direction of a particular pixel may be encoded onto the red channel of the pixel, and the vertical component of the dilation direction of the particular pixel may be encoded onto the green channel of the pixel. In this way, all of the border pixels and/or vertices, including corner vertices, may have a dilation direction encoded onto one or more of their respective data channels. It will be appreciated that any of the vertical or horizontal components of the dilation direction may be encoded onto one or more data channels (e.g., RGB data channels) corresponding to each of the border pixels of the laid-out mesh.

At block 410, border mesh seams may be incrementally dilated according to the encoded direction of dilation corresponding to the border pixels and/or border vertices on the border mesh seam. In this process, the direction of dilation at each of the border pixels may be determined and the dilation process may involve pushing texture from a border pixel onto a border seam incrementally by a defined number of pixels. The dilation process in a directional manner may be continued until the entirety of the border seam is textured.

It should be appreciated that if a particular polygon on the border of a laid-out mesh includes two or more disparate textures, then the directional dilation may cause an angle between different texture to be maintained in the border seams, as they were within the border polygon. In contrast, the angle between textures in a border polygon may not be maintained in an adjacent border seam of the laid-out mesh if an omnidirectional dilation mechanism is used.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
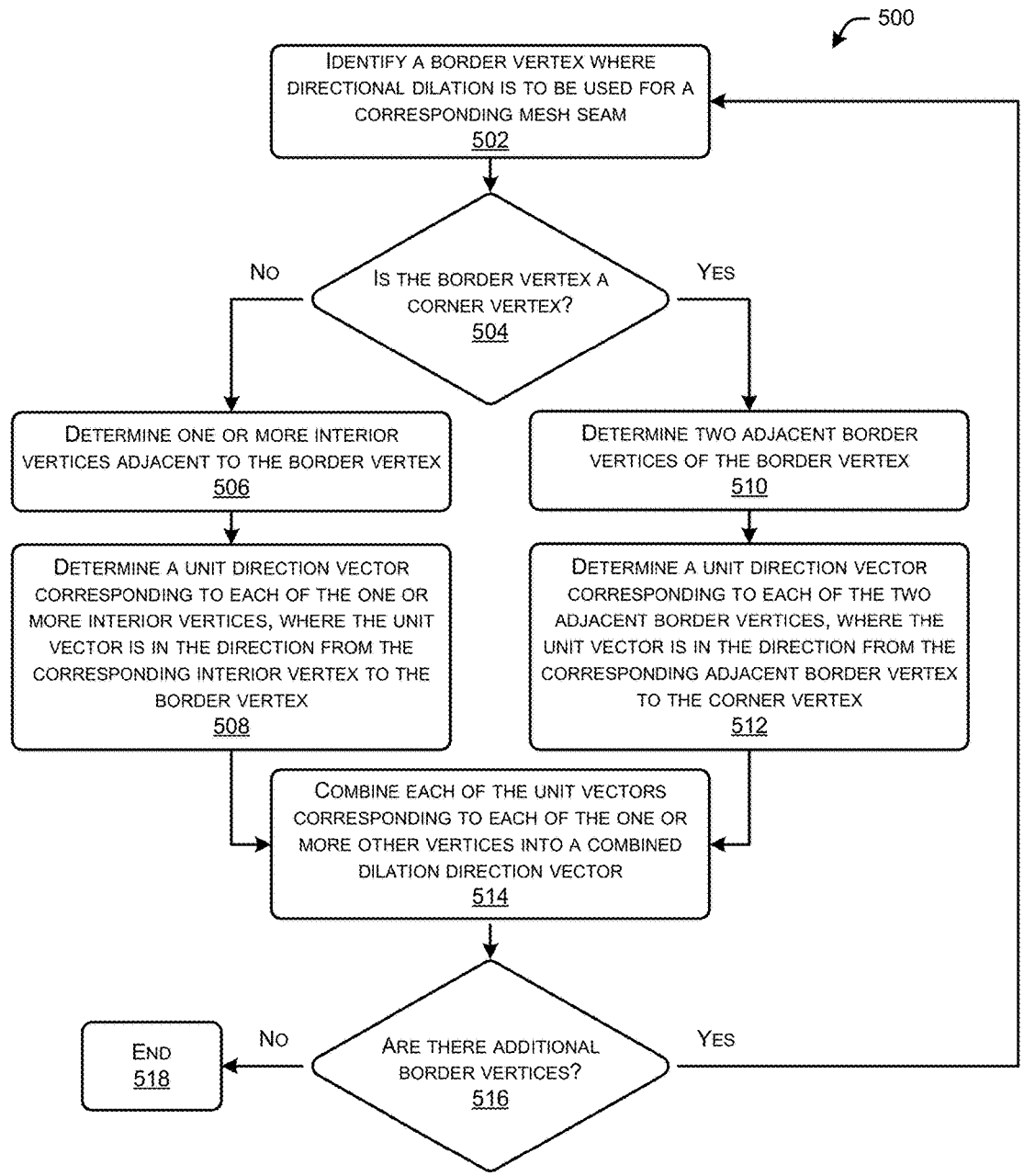
FIG. 5 illustrates a flow diagram of an example method to determine a direction of dilation at a vertex and encoding the direction in one or more data channels associated with the vertex, in accordance with example embodiments of the disclosure.

FIG. 5 illustrates a flow diagram of an example method 500 to determine a direction of dilation at a vertex and encoding the direction in one or more data channels associated with the vertex, in accordance with example embodiments of the disclosure. In some example embodiments, method 500 may be an implementation of block 404 of method 400 of FIG. 4. Method 500 may be performed by one or more image manipulation system(s), in example embodiments. In some cases, the image manipulation system(s) may cooperate with one or more other computing system(s) to perform the processes of method 500. The method 500, in example embodiments, may be performed in response to user input(s) to perform the processes of method 500. These user inputs may be to the image manipulation system(s) directly, or via one or more client devices.

At block 502, a border vertex may be identified where directional dilation is to be used for a corresponding mesh border seam. This process may involve identifying a laid-out mesh and determining each of the border seams and the border vertices defining those border seams. A particular one of the border vertices may be selected to determine the dilation direction thereof according to method 500.

At block 504, it may be determined whether the border vertex is a corner vertex. This may be determined by identifying if the border vertex has a nearest neighbor internal vertex of the laid-out mesh. If the border vertex does have a nearest neighbor internal vertex, then the border vertex may not be a corner vertex. However, if the border vertex has only neighbor vertices that are themselves border vertices, then the border vertex may be a corner vertex.

If it is determined at block 504 that the border vertex is not a corner vertex, then the method 500 may proceed to block 506 where one or more interior vertices adjacent to the border vertex may be determined. These adjacent interior vertices may be the nearest neighbor vertices of the border vertex which are not border vertices themselves. At block 508, a unit direction vector may be determined corresponding to each of the one or more interior vertices where the unit vector is in the direction from the corresponding interior vertex to the border vertex.

At block 504, if it was determined that the border vertex is a corner vertex, then the method 500 may proceed to block 510 where two adjacent border vertices of the border vertex may be determined. In other words, the nearest neighbor border vertices of the border vertex are identified. At block 512, a unit direction vector corresponding to each of the two adjacent border vertices may be determined where the unit vector is in the direction from the corresponding adjacent border vertex to the corner vertex.

At block 514, regardless of whether the border vertex is a corner vertex or not, each of the unit vectors corresponding to each of the other one or more vertices may be combined into a dilation direction vector of the border vertex. The combination of unit vectors may also be a unit vector itself as the dilation direction vector indicating the dilation direction at the border vertex. This dilation direction vector may represent the direction of dilation at the seam defined by the border vertex of the laid-out mesh.

At block 516, it may be determined if there are any additional border vertices. If there are additional border vertices, then the method 500 may return to block 502 to continue to determine a dilation direction at each of the border vertices of the laid-out mesh. If, on the other hand, the dilation direction and encoding of dilation direction has been performed for all of the border vertices, then the method 500 may proceed to block 522 where the method 500 may end.

Figure 6:
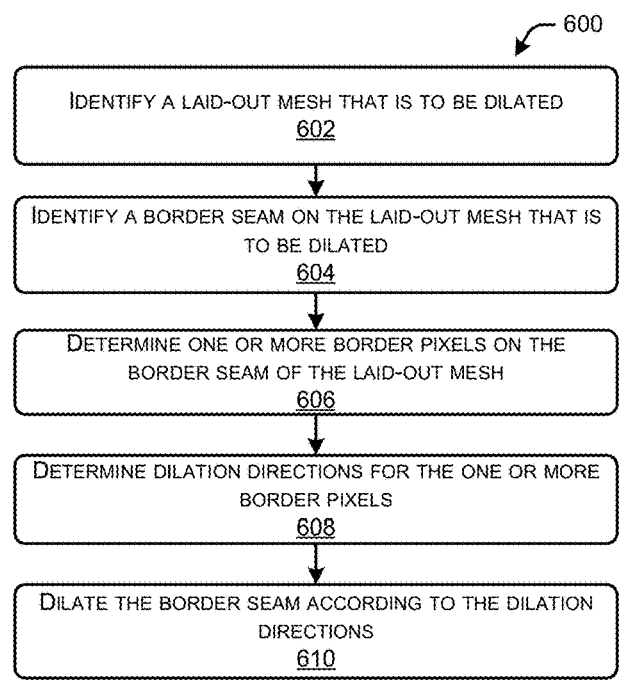
FIG. 6 illustrates a flow diagram of an example method for dilating a mesh border according to a determined dilation direction, in accordance with example embodiments of the disclosure.

FIG. 6 illustrates a flow diagram of an example method 600 for dilating a mesh border according to a determined dilation direction, in accordance with example embodiments of the disclosure. In some example embodiments, method 600 may be an implementation of block 410 of method 400 of FIG. 4. Method 600 may be performed by one or more image manipulation system(s), in example embodiments. In some cases, the image manipulation system(s) may cooperate with one or more other computing system(s) to perform the processes of method 600. The method 600, in example embodiments, may be performed in response to user input(s) to perform the processes of method 600. These user inputs may be to the image manipulation system(s) directly, or via one or more client devices.

At block 602, a laid-out mesh that is to be dilated may be identified. As discussed above, the laid-out mesh may be a mesh generated for an object to be imaged that is opened along a seam and flattened out. At block 604, a border on the laid-out mesh that is to be dilated may be identified. This border may be a seam along which the object mesh is opened for flattening. At block 606, one or more border pixels on the border seam of the mesh may be determined. In example embodiments, the border pixels may be border pixels for which a dilation direction had been determined and/or encoded according to the processes of blocks 404, 406, and 408 of method 400 of FIG. 4.

At block 608, a dilation direction for the one or more border pixels may be determined. The determination dilation direction may be based at least in part on accessing one or more data channels associated with the border pixels. These one or more data channels for each border pixel may have encoded thereon the dilation direction at the border pixel to be used to dilate the border seam. The encoding of the one or more data channels was previously discussed in conjunction with block 408 of method 400 of FIG. 4. In some cases, there may be two data channels that are used to encode a vertical and horizontal component of the dilation direction. For example, two out of the three RGB channels of a border pixel may be used to encode each of the vertical and horizontal components of the dilation direction to be used at the border seam. In other example embodiments, other data channels, such as, for example, metadata associated with the border pixel, may be used to encode and/or store the dilation direction associated with the border pixel.

At block 610, the border seam may be dilated according to the dilation direction. As discussed above, the dilation may be done in an incremental manner, such as by pushing texture from the adjacent pixels onto the border seam by a certain number of pixels at a time until all of the pixels of the border seam have been textured.

Figure 7:
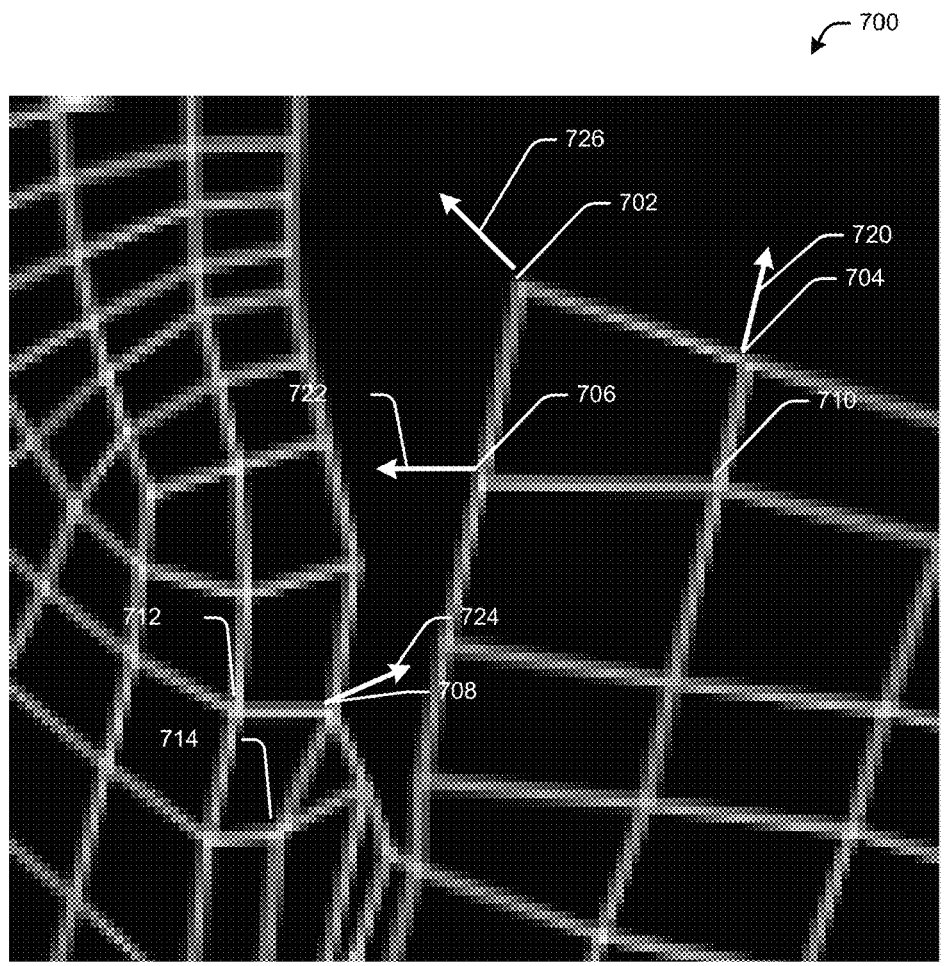
FIG. 7 illustrates a schematic diagram of an example portion of the laid-out mesh image of FIG. 3 with example dilation directions at border vertices of the mesh layout diagram, in accordance with example embodiments of the disclosure.

FIG. 7 illustrates a schematic diagram of an example portion 700 of the laid-out mesh image 310 of FIG. 3 with example dilation directions at border vertices of the mesh layout diagram, in accordance with example embodiments of the disclosure.

The laid-out mesh portion 700 represents an expanded portion of the laid-out mesh 310, particularly near the mesh border region 312. The laid-out mesh 700 may include a number of border vertices, such as border vertices 702, 704, 706, 708. Furthermore, the laid-out mesh portion 700 may include a number of internal vertices, such as internal vertices 710, 712, 714. It should be noted that border vertex 702 is also a corner vertex. The corner vertex 702 has as nearest neighbor vertices only other border vertices 704, 706. As can be seen, border vertex 704 is not a corner vertex since it has at least one nearest neighbor vertex that is an internal vertex 710. Based at least in part on internal vertices 710 712, 714, and border vertices 706 and 704, the dilation direction of each of the border vertices 702, 704, 706, 708 may be determined. The dilation direction is depicted here by dilation direction vectors 720, 722, 724, 726.

The dilation direction vector 720 may be determined by identifying the internal vertex 710 as the nearest neighbor internal vertex of border vertex 704. Next, a unit directional vector may be determined from the internal vertex 710 to the border vertex 704. Since border vertex 704 does not have any other internal vertex nearest neighbors other than internal vertex 710, the unit directional vector as determined from internal vertex 710 to border vertex 704 represents the dilation direction vector 720.

It can be seen that the dilation direction for more than one border vertex may be determined based at least in part on the same internal vertex for example the dilation direction vector 722 may be determined at border vertex 706 as a unit directional vector from internal vertex 710 to border vertex 706. The internal vertex 710 is used for determining the dilation direction at both the border vertex 704, as well as the border vertex 706.

In the case where there may be more than one internal vertices as nearest neighbors, such as internal vertices 712, 714 as nearest internal vertices neighbors of the border vertex 708, the dilation direction vector 724 may be determined based at least in part on both of the internal vertices 712, 714. A unit directional vector may be determined from internal vertex 712 to border vertex 708, and similarly another unit directional vector may be determined from internal vertex 714 to the border vertex 708. Next, the two unit directional vectors may be combined to determine the dilation direction vector 724.

At corner vertex 702, the nearest border vertices may be identified as border vertex 704 and border vertex 706. A unit directional vector from border vertex 706 to corner vertex 702 may be determined, and similarly a unit directional vector from border vertex 704 to corner vertex 702 may be determined. The two unit directional vectors may then be combined to generate the dilation direction vector 726 for the corner vertex 702. In this way, all of the border vertices and corner vertices of the laid-out mesh 700, 310 may be determined. These dilation directions may then be used to determine the dilation directions of pixels therebetween on the border seam. In this way, the dilation directions (e.g., vertical and horizontal components of the dilation directions) may be encoded onto data channel(s) corresponding to each of the border vertices.

Figure 8:
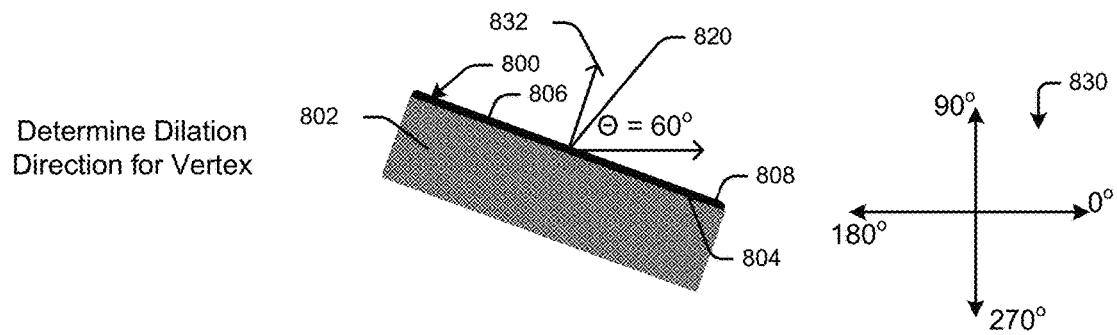
FIG. 8 illustrates a schematic diagram of an example laid-out mesh segment with border pixels for which a dilation direction vector is determined, encoded, and then used to dilate the mesh borders, in accordance with example embodiments of the disclosure.
Figure 8:
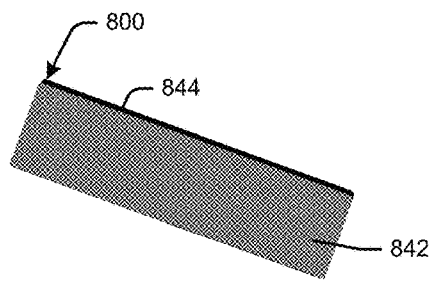
Figure 8:
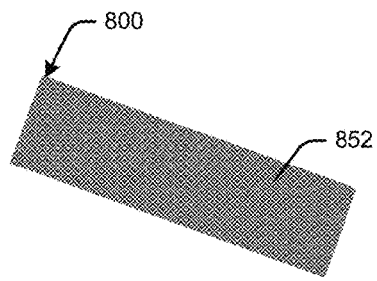

FIG. 8 illustrates a schematic diagram of an example laid-out mesh segment 800 with texture 802, mesh border 804, border vertices 806, 808, and a border pixel 820 for which a dilation direction vector 832 is determined, encoded, and then used to dilate the mesh border 804, in accordance with example embodiments of the disclosure.

Laid-out mesh segment 800 has two polygons (not shown) with texture 802 ascribed thereto. The border vertices 806, 808 may lie along the mesh border 804. A dilation direction may be determined at each of these order vertices 806, 808, such as by implementing method 500 of FIG. 5.

A direction guide 830 provides a set of directions that may be used for further definition of dilation directions, as discussed herein. Dilation direction vector 832 may be determined at the border pixel 820 by determining a dilation direction at each of the border vertices 806, 808 and then interpolating between the border vertices 806, 808. It may be determined, according to the directions set out in direction guide 830, that the angle, shown here as theta, of the dilation direction vector 832 may be 60° for border pixel 820.

The dilation direction, as determined for laid-out mesh segment 800, may be encoded using data channels associated with the border pixel 820. This process may entail determining a horizontal component and a vertical component of the dilation direction vector 832. In example embodiments, the horizontal component of the dilation direction vector 832 may be determined as the sine of the angle theta as sin(60°). Similarly, the vertical component of the dilation direction vector 832 may be the cosine of the angle theta as cos(60°). When the data channels are 8-bit channels, they may be encoded as shown. It will be appreciated that channels of different bit size may be encoded in a similar manner.

After encoding the dilation direction on to data channels associated with pixel 820 and performing a similar process for the other pixels along the border seam 804, dilation may be commenced in an iterative fashion where the border seam 804 may be dilated in the direction as determined according to dilation direction vector 832. As shown, texture 842 may be extended onto the border seam 804. This texturing by dilation may be directional, specifically in the direction of dilation direction as encoded onto the border pixels, including border pixel 820. After some dilation of laid-out mesh segment 800 portion 844 of the border mesh may remain to be textured. With additional texturing, the entirety of the border seam 804 may be textured directionally with texture 852 as extended from the border pixels onto the border seam 804.

Figure 9:
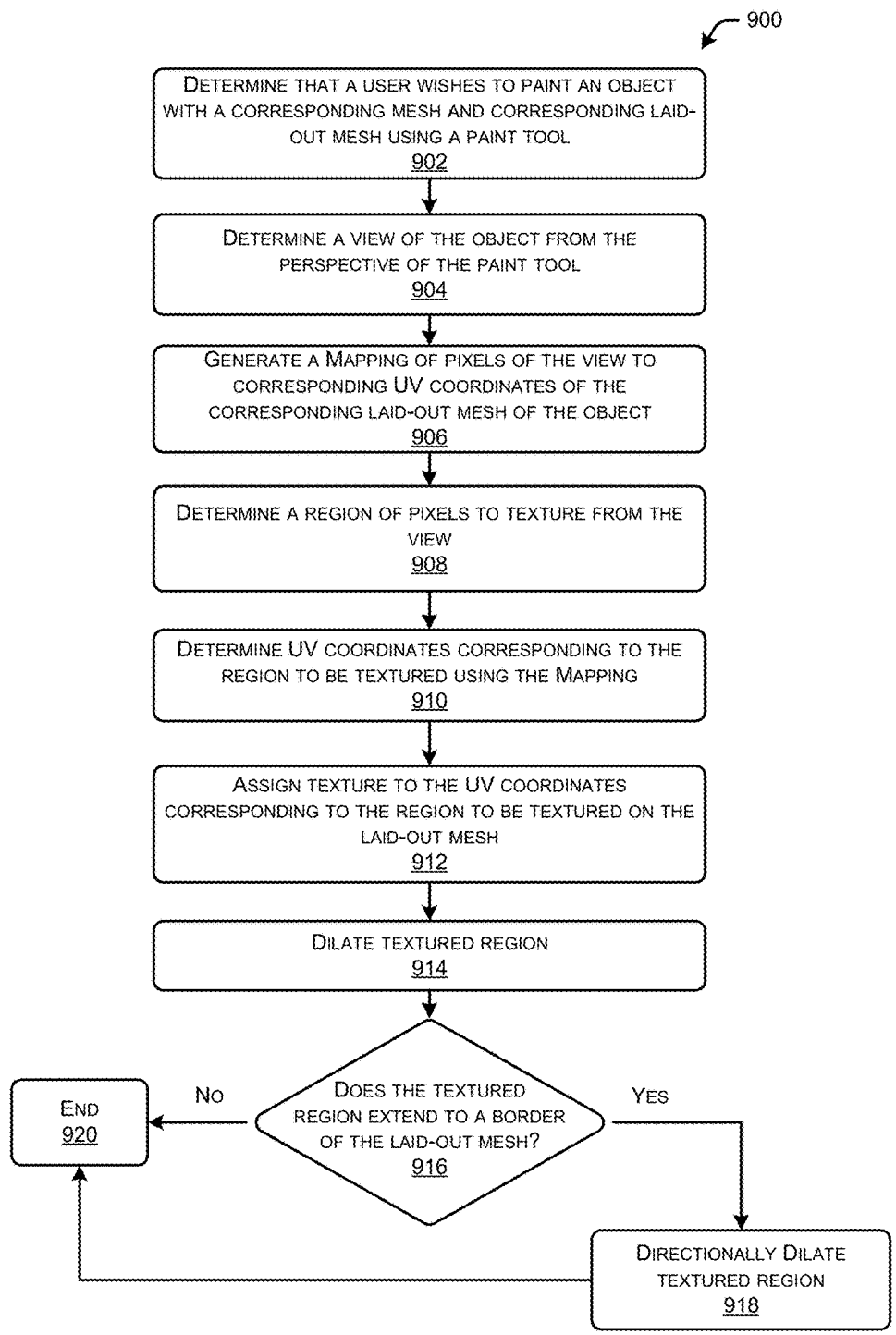
FIG. 9 illustrates a flow diagram of an example method for painting an object in a direction normal to a view of the object from the perspective of a paint tool, in accordance with example embodiments of the disclosure.

FIG. 9 illustrates a flow diagram of an example method 900 for painting an object in a direction normal to a view of the object from the perspective of a paint tool, in accordance with example embodiments of the disclosure. Method 900 may be performed by one or more image manipulation system(s), in example embodiments. In some cases, the image manipulation system(s) may cooperate with one or more other computing system(s) to perform the processes of method 900. The method 900, in example embodiments, may be performed in response to user input(s), such as to operate a paint tool, to perform the processes of method 900. These user inputs may be to the image manipulation system (s) directly, or remotely via one or more client devices.

At block 902 it may be determined that a user wishes to paint an object having a corresponding mesh and a corresponding laid-out mesh using a paint tool. This determination may be based at least in part on the user selecting a paint tool such as a paint tool that emulates a paint brush or a spray paint can. The user may be able to control the paint tool or an icon thereof by positioning the icon in proximity of regions of the object that he or she wishes to paint. These regions may correspond to a view of the object that the user wishes to paint which is different from a view that is rendered to the user, such as on a screen. In other words, a user may use the paint tool to apply texture to a region of the object that is not the current view of the object rendered to the user. For example, if the user positions a paint tool along a torso of the dog of image 100 of FIG. 1, the user may intend to color the torso portion of the dog, even if the dog is rendered to the user facing forward.

At block 904, a view of the object from the perspective of the paint tool may be determined. This view may be generated by one or more graphical processing unit(s) (GPUs) and/or central processing unit(s) (CPUs) of the image manipulation system(s). The determined view from the perspective of the paint tool may not be displayed to a user, but may rather be stored in memory for use in the subsequent processes of method 900.

At block 906, a mapping of pixels of the view corresponding to UV coordinates of the corresponding laid-out mesh of the object may be determined. The mapping may tag each of the pixels of the view from the perspective of the paint tool with their respective UV coordinates.

At block 908, a region of pixels to texture may be determined. This region may be based at least in part on user input in placing and/or moving the paint tool icon. Thus, the region may be determined as a spot on the object that would be painted on a single pass and/or placement of the paint tool.

At block 910, UV coordinates corresponding to the region to be textured may be determined using the mapping. The region to be textured, as a collection of pixels, may have UV coordinates corresponding to those pixels. The correspondence between the pixels of the region and their respective UV coordinates may be determined using the mapping, as generated by the processes of block 906. The UV coordinates of the region enable the texturing of those pixels of the region as defined on a laid-out mesh of the object.

At block 912, texture may be assigned to the UV coordinates corresponding to the region to be textured on the laid-out mesh. The texture defined pixels (e.g., texels) may be stored in memory and/or a file associated with the image of the object.

At block 914, textured region may be dilated. This may be an omnidirectional dilation. When texturing, there may be gaps in pixels that are not textured as intended. Thus, by performing the dilation process, the pixels that may not have been textured correctly are filled in with the texture of proximal pixels.

At block 916, it may be determined if the textured region extend to a border of the laid-out mesh. If the textured region extends to a border of the laid-out mesh, then at block 918, the textured region may be directionally dilated. This directional dilation may be similar to the mechanisms described in conjunction with FIGS. 4, 5, and 6. After performing the directional dilation, the method 900 may end at block 920. If at block 916 it was determined that the textured region does not extend to a border of the laid-out mesh, then the method may end at block 920.

It will be appreciated that by applying paint or texture in a normal direction, the viewing direction of the object will not dictate how or where paint is applied on the object. This may improve user control over how he/she wishes to texture images and may reduce an amount of redraws and/or touch-ups a user may have to perform. In addition to providing an improved user experience, by allowing painting without having to turn the object to effectively apply paint, less computing resources (e.g., processing bandwidth) may have to be expended on re-rendering objects.

Figure 10:
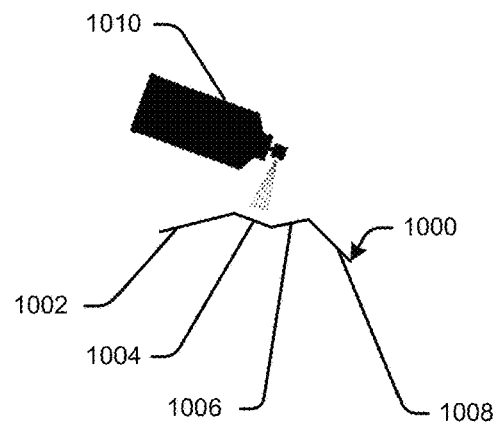
FIG. 10 illustrates a schematic diagram of a paint tool that applies paint to an object in a direction substantially normal to the face of the object being painted, in accordance with example embodiments of the disclosure.
Figure 10:
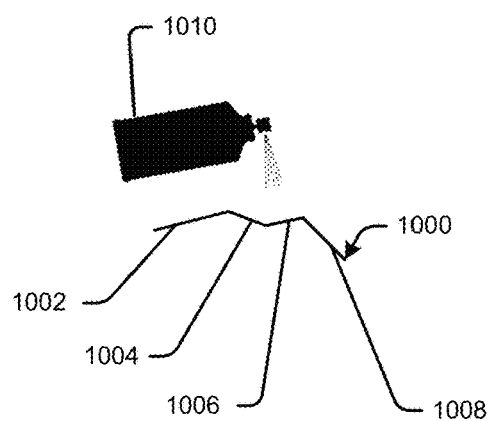

FIG. 10 illustrates a schematic diagram of a paint tool that applies paint to an object 1000 in a direction substantially normal to the face of the object 1000 being painted, in accordance with example embodiments of the disclosure.

A portion of an object mesh 1000 may include a first polygon 1002, a second polygon 1004, a third polygon 1006, and a fourth polygon 1008. When a user wishes to paint the object of mesh 1000, he or she may be presented with an icon 1010 representing a paint tool. The user may be able to control the movement of the icon 1010 to indicate where on the object of mesh 1000 he or she wishes to paint. If the user positions the icon 1010 of the paint tool over the first polygon 1002, paint may be applied from a direction normal to the polygon 1002 as shown. Even if the paint is applied to other polygons 1004, 1006, 1008, the direction of application may be based at least in part on the center of the paint tool being positioned over the polygon 1002. If the user continues to paint the object and wishes to paint a portion where the paint tool icon 1010 is placed over polygon 1006, the normal direction of the object 1000 may be determined from the perspective of the paint tool and texture may be applied from that direction, such as by the processes of method 900 of FIG. 9. In this way, the user may be able to apply paint or texture to the object without having to make adjustments for viewing direction or directionality of the application of texture or paint.

Figure 11:
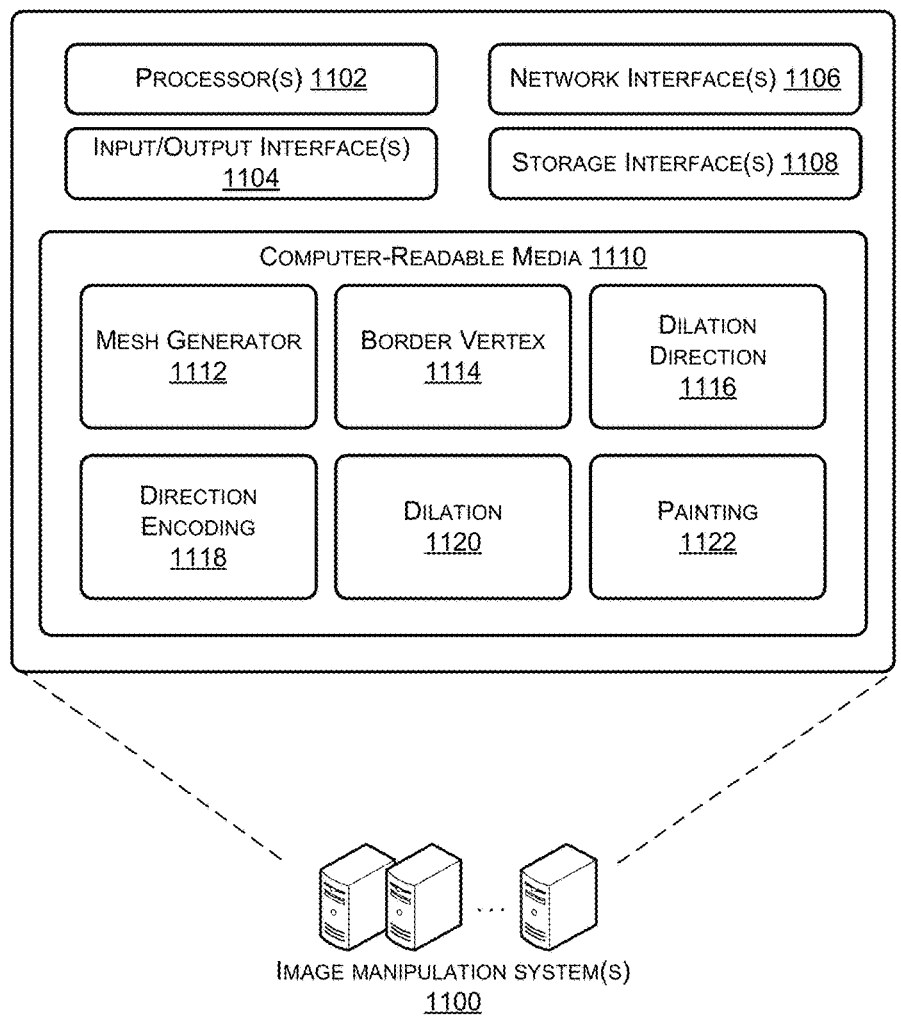
FIG. 11 illustrates a block diagram of example image manipulation system(s) that may provide directional dilation at mesh border seams and paint tools from a normal direction to mesh polygons, in accordance with example embodiments of the disclosure.

FIG. 11 illustrates a block diagram of example image manipulation system(s) 1100 that may provide directional dilation at mesh border seams and paint tools to texture from a normal direction to mesh polygons, in accordance with example embodiments of the disclosure. It should be appreciated that in example embodiments, the image manipulation system(s) 1100 may be incorporated into, or operate in conjunction with, one or more game system(s) that may be hosting a variety of online games. The image manipulation system(s) 1100 may include one or more processor(s) 1102, one or more input/output (I/O) interface(s) 1104, one or more network interface(s) 1106, one or more storage interface(s) 1108, and computer-readable media 1110.

In some implementations, the processors(s) 1102 may include a central processing unit (CPU), a graphics processing unit (GPU), both CPU and GPU, a microprocessor, a digital signal processor or other processing units or components known in the art. Alternatively, or in addition, the functionality described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1102 may possess its own local memory, which also may store program modules, program instructions, program data, and/or one or more operating systems. The one or more processor(s) 1102 may include one or more cores.

The one or more input/output (I/O) interface(s) 1104 may enable the image manipulation system(s) 1100 to detect interaction with a user and/or other computing system(s). The I/O interface(s) 1104 may include a combination of hardware, software, and/or firmware and may include software drivers for enabling the operation of any variety of I/O device(s) integrated on the image manipulation system(s) 1100 or with which the image manipulation system(s) 1100 interacts, such as displays, microphones, speakers, cameras, switches, and any other variety of sensors, or the like. In example embodiments, the I/O devices of the image manipulation system(s) 1100 may include audio, video, and/or other input functionality.

The network interface(s) 1106 may enable the image manipulation system(s) 1100 to communicate via the one or more network(s). The network interface(s) 1106 may include a combination of hardware, software, and/or firmware and may include software drivers for enabling any variety of protocol-based communications, and any variety of wireline and/or wireless ports/antennas. For example, the network interface(s) 1106 may comprise one or more of a cellular radio, a wireless (e.g., IEEE 802.1x-based) interface, a Bluetooth® interface, and the like. In some embodiments, the network interface(s) 1106 may interfaces to the Internet. The network interface(s) 1106 may further enable the image manipulation system(s) 1100 to communicate over circuit-switch domains and/or packet-switch domains. The network interface(s) 1106 may be used to send rendered images to client device(s) and/or receive user inputs from the client device(s).

The storage interface(s) 1108 may enable the processor(s) 1102 to interface and exchange data with the computer-readable medium 1110, as well as any storage device(s) external to the image manipulation system(s) 1100. The storage interface(s) 1108 may further enable access to removable media.

The computer-readable media 1110 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1110 may be implemented as computer-readable storage media (CRSM), which may be any available physical media accessible by the processor(s) 1102 to execute instructions stored on the memory 1110. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 1102. The computer-readable media 1110 may have an operating system (OS) and/or a variety of suitable applications stored thereon. The OS, when executed by the processor(s) 1102 may enable management of hardware and/or software resources of the image manipulation system(s) 1100.

Several functions such as instruction, data stores, and so forth may be stored within the computer-readable media 1110 and configured to execute on the processor(s) 1102. The computer readable media 1110 may have stored thereon a mesh generator block 1112, a border vertex block 1114, a dilation direction block 1116, a direction encoding block 1118, a dilation block 1120, and a painting block 1122. It will be appreciated that each of the functions 1112, 1114, 1116, 1118, 1120, 1122, may have instructions stored thereon that when executed by the processor(s) 1102 may enable various operations of the image manipulation system(s) 1100. It should further be noted that one or more of the functions 1112, 1114, 1116, 1118, 1120, 1122 may work in conjunction with one or more other imaging software, such as Maya® by Autodesk, Inc. of San Rafael, Calif.

The instructions stored in the mesh generator block 1112, when executed by the processor(s) 1102, may configure the image manipulation system(s) 1100 to generate a mesh and/or a laid-out mesh of an object for which a three-dimensional image is to be generated. The processor(s) 1102 may be configured to determine a suitable number of vertices, and therefore, polygons to include on a mesh of an object. The processor(s) 1102, by executing the instructions stored in the mesh generator block 1112, may be configured to determine where to open and flatten a mesh to generate a corresponding laid-out mesh.

The instructions stored in the border vertex block 1114, when executed by the processor(s) 1102, may configure the image manipulation system(s) 1100 to identify border vertices of a laid-out mesh. This process of border vertex identification may entail identifying border seams of a laid-out mesh and then identifying vertices on those border seams. The processor(s) 1102 may further determine whether a border vertex is a corner vertex. This determination may be based on whether the border vertex has any neighboring internal vertices. If there are no neighboring internal vertex, and only neighboring border vertices, then the border vertex may be a corner vertex.

The instructions stored in the dilation direction block 1116, when executed by the processor(s) 1102, may configure the image manipulation system(s) 1100 to determine dilation directions at each of the border vertices. For a border vertex, which is not a corner vertex, the one or more processor(s) 1102 may determine a unit direction vector from each of one or more interior vertices to the border vertex, where the one or more interior vertices are neighbor vertices of the border vertex. Next, the processor(s) 1102, may combine the unit direction vectors to determine the dilation direction vector. For a corner vertex, the one or more processor(s) 1102 may determine a unit direction vector from each neighboring border vertex to the border vertex for which the dilation direction is to be determined. Similar to the non-corner vertex case, the processor(s) 1102, may combine the unit direction vectors corresponding to the neighbor border vertices to determine the dilation direction vector.

The instructions stored in the direction encoding block 1118, when executed by the processor(s) 1102, may configure the image manipulation system(s) 1100 to determine components of the dilation direction. For example, a vertical and horizontal component of the dilation direction may be determined by the processor(s) 1102. The processor(s) 1102 may encode the dilation direction onto one or more data channels of the border vertex to which the dilation direction pertains. This may entail encoding each component of the dilation direction onto a separate data channel of the border vertex. For example, each vertex may have red, green, and blue (RGB) data associated therewith. In example embodiments, the processor(s) 1102 may The instructions stored in the dilation block 1120, when executed by the processor(s) 1102, may configure the image manipulation system(s) 1100 to dilate a laid-out mesh, with the borders of the laid-out mesh dilated directionally. The processor(s) 1102 may dilate a mesh by texturing a predetermined number of pixels of mesh seams according to the texture of adjacent polygons. The processor(s) 1102 may continue to texture the seams by the predetermined number of pixels until the entirety of the pixels of the seam are textured.

The instructions stored in the painting block 1122, when executed by the processor(s) 1102, may configure the image manipulation system(s) 1100 to provide a paint or texturing tool that can be manipulated by a user to texture a surface of an object in an image. The processor(s) 1102 may determine that a user wishes to use a texturing tool based at least in part on user input. The processor(s) 1102 may further determine based upon user input of where the user may position an icon corresponding to a paint tool relative to the object, a location on the object to be painted and the corresponding mesh polygon of that location. The functions of painting block 1122 may further enable the processor(s) 1102 to identify a direction normal to the object to be painted from the perspective of the drawing tool, and then apply paint to the object from the normal direction. The processors 1102 may also generate a mapping of UV coordinates of the object to a rendered view from the perspective of the painting tool. This mapping may be used to associate texture onto pixels of a laid-out mesh of the object.

The illustrated aspects of the claimed subject matter may also be practiced in distributed computing environments where certain tasks are performed by remote processing devices that are linked through a communications network. In a distributed computing environment, program functions can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
   one or more processors; and
   one or more computer-readable media storing computer-executable instructions that, when executed by the one or more processors, cause the one or more processors to:
   identify a laid-out mesh of an image;
   identify a border vertex of the laid-out mesh, the border vertex along a border seam of the laid-out mesh;
   determine an inner vertex of the laid-out mesh;
   determine a direction from the inner vertex to the border vertex;
   determine a dilation direction for a border pixel based at least in part on the direction from the inner vertex to the border vertex; and
   dilate the border seam in the dilation direction.

2. The system of claim 1, wherein the computer-executable instructions further cause the one or more processors to:
   encode the dilation direction using one or more data channels associated with the border pixel.

3. The system of claim 2, wherein the one or more data channels associated with the border pixel comprises a first data channel and a second data channel associated with the border pixel, and wherein to encode the dilation direction, the computer-executable instructions further cause the one or more processors to:
   determine a vertical component of the dilation direction;
   determine a horizontal component of the dilation direction;
   encode the vertical component of the dilation direction using the first data channel; and
   encode the horizontal component of the dilation direction using the second data channel.

4. The system of claim 2, wherein to dilate the border seam in the dilation direction, the computer-executable instructions further cause the one or more processors to:
   access the one or more data channels associated with the border pixel;
   decode the dilation direction from the one or more data channels; and
   provide texture from the border pixel onto the border seam in the dilation direction.

5. The system of claim 1, wherein to dilate the border seam in the dilation direction, the computer-executable instructions further cause the one or more processors to:
   repeatedly paint texture from the border pixel onto the border seam in the dilation direction by a predetermined number of pixels until all pixels of the border seam are painted.

6. The system of claim 1, wherein to determine the dilation direction for the border seam, the computer-executable instructions further cause the one or more processors to:
   determine that the dilation direction is further based on a second direction from a second inner vertex to a second border vertex.

7. The system of claim 1, wherein the inner vertex is a first inner vertex and the direction from the first inner vertex to the border vertex is a first direction, wherein to determine the dilation direction, the computer-executable instructions further cause the one or more processors to:
   determine a second direction from a second inner vertex to the border vertex, wherein the dilation direction is based at least in part on the first direction and the second direction.

8. The system of claim 1, wherein the border vertex is a first border vertex, and wherein the computer-executable instructions further cause the one or more processors to:
   identify a corner vertex of the laid-out mesh;

determine a second direction from the first border vertex to the corner vertex;

determine a third direction from a second border vertex to the corner vertex;

determine a second dilation direction for a second border pixel based at least in part on the third direction and the second direction; and dilate a portion of the seam adjacent to the second border pixel in the second dilation direction.

9. A computer-implemented method, comprising:

identifying a laid-out mesh of an image;

identifying a first vertex of the laid-out mesh, the first vertex along a seam of the laid-out mesh;

determining a second vertex of the laid-out mesh;

determining a direction from the second vertex to the first vertex;

determining a dilation direction for a pixel on the seam based at least in part on the direction from the second vertex to the first vertex; and encoding the dilation direction onto one or more data channels of the pixel.

10. The computer-implemented method of claim 9, further comprising:

dilating the seam adjacent to the pixel in the dilation direction.

11. The computer-implemented method of claim 10, wherein dilating the seam in the dilation direction further comprises:

decoding the dilation direction from the one or more data channels of the pixel; and repeatedly painting texture from the pixel onto the seam in the dilation direction by a predetermined number of pixels until all pixels of the seam are painted.

12. The computer-implemented method of claim 9, wherein encoding the dilation direction onto one or more data channels of the pixel further comprises:

determining a vertical component of the dilation direction;

determining a horizontal component of the dilation direction;

encoding the vertical component of the dilation direction using a green data channel; and encoding the horizontal component of the dilation direction using a red data channel.

13. The computer-implemented method of claim 9, wherein the first vertex is a border vertex of the laid-out mesh, and wherein the second vertex is an inner vertex of the laid-out mesh.

14. The computer-implemented method of claim 9, wherein the direction is a first direction, the method further comprising:

determining a third vertex of the laid-out mesh; and determining a second direction from the third vertex to the first vertex, wherein the dilation direction for the pixel is based at least in part on the second direction.

15. The computer-implemented method of claim 14, wherein the first vertex is a corner vertex of the laid-out mesh, wherein the second vertex is a border vertex of the laid-out mesh, and wherein the third vertex is a border vertex of the laid-out mesh.

16. A system, comprising:

one or more processors; and one or more computer-readable media storing computer-executable instructions that, when executed by the one or more processors, cause the one or more processors to:

receive a user input to apply texture to an object image;

display a paint tool icon;

determine a rendering of the object image from a perspective of the paint tool icon;

generate a mapping of UV coordinates of the object to the rendering;

determine a region of the object that is to be textured;

determine a set of UV coordinates corresponding to the region based at least in part on the mapping; and associate the set of UV coordinates to the texture.

17. The system of claim 16, wherein the user input is associated with a first user control of a paint tool to apply paint on a surface of the object image.

18. The system of claim 17, wherein the computer-executable instructions further cause the one or more processors to:

dilate the region after associating the texture to the set of UV coordinates.

19. The system of claim 17, wherein the computer-executable instructions further cause the one or more processors to:

determine that the region extends to a border of a laid-out mesh of the object; and directionally dilating the region based at least in part on determining that the region extends to the border of the laid-out mesh.

20. The system of claim 16, wherein the user input is a first user input, the perspective is a first perspective, the rendering is a first rendering, the mapping is a first mapping, the region is a first region, and the set of UV coordinates is a first set of UV coordinates, wherein the computer-executable instructions further cause the one or more processors to:

receive a second user input to apply texture to the object image;

move the paint tool icon relative to the object based at least in part on the second user input;

determine a second rendering of the object image from a second perspective of the paint tool icon;

generate a second mapping of the UV coordinates of the object to the second rendering;

determine a second region of the object that is to be textured;

determine a second set of UV coordinates corresponding to the second region based at least in part on the second mapping; and associate the second set of UV coordinates to the texture.

* * * * *